(12) United States Patent
Collette et al.

(10) Patent No.: US 12,187,015 B2
(45) Date of Patent: Jan. 7, 2025

(54) POLYVINYLIDENE FLUORIDE-ACRYLATE AND THERMOPLASTIC POLYURETHANE MULTILAYER PROTECTIVE FILM

(71) Applicants: ARGOTEC LLC, Geenfield, MA (US); SWM Luxembourg, Contern (LU)

(72) Inventors: David Collette, South Hadley, MA (US); Thomas Burke, Conway, MA (US)

(73) Assignees: DelStar Technologies, Inc.; Mativ Luxembourg (LU)

( * ) Notice: Subject to any disclaimer, the term of this patent is extended or adjusted under 35 U.S.C. 154(b) by 0 days.

(21) Appl. No.: 18/452,787

(22) Filed: Aug. 21, 2023

(65) Prior Publication Data

US 2024/0051277 A1   Feb. 15, 2024

Related U.S. Application Data

(62) Division of application No. 16/764,378, filed as application No. PCT/EP2018/081653 on Nov. 16, 2018, now Pat. No. 11,731,405.

(60) Provisional application No. 62/587,429, filed on Nov. 16, 2017.

(51) Int. Cl.
| | |
|---|---|
| *B32B 27/08* | (2006.01) |
| *B32B 27/30* | (2006.01) |
| *B32B 27/40* | (2006.01) |
| *G11C 7/12* | (2006.01) |
| *G11C 7/18* | (2006.01) |

(52) U.S. Cl.
CPC ............ *B32B 27/08* (2013.01); *B32B 27/304* (2013.01); *B32B 27/308* (2013.01); *B32B 27/40* (2013.01); *B32B 2307/406* (2013.01); *B32B 2307/412* (2013.01); *B32B 2307/584* (2013.01); *B32B 2307/732* (2013.01); *B32B 2327/00* (2013.01); *B32B 2333/12* (2013.01); *B32B 2375/00* (2013.01)

(58) Field of Classification Search
None
See application file for complete search history.

(56) References Cited

U.S. PATENT DOCUMENTS

| | | |
|---|---|---|
| 6,362,271 B1 | 6/2002 | Lin et al. |
| 2009/0027525 A1 | 1/2009 | Lin et al. |
| 2009/0202759 A1 | 8/2009 | O'Brien et al. |
| 2009/0275251 A1* | 11/2009 | Bonnet ............... B32B 7/12 |
| | | 428/421 |
| 2016/0046012 A1 | 2/2016 | Crabb et al. |

FOREIGN PATENT DOCUMENTS

| | | |
|---|---|---|
| CN | 103619923 A | 3/2014 |
| JP | 2000517258 A | 12/2000 |
| KR | 10-2008-0012341 A | 2/2008 |
| WO | WO1998008677 A1 | 3/1998 |
| WO | 2005058594 A1 | 6/2005 |
| WO | 2011062836 A1 | 5/2011 |
| WO | WO2013033313 A1 | 3/2013 |
| WO | 2014022049 A1 | 2/2014 |

OTHER PUBLICATIONS

China National Intellectual Property Administration (CNIPA); Rejection Decision CN Patent Application No. 201880074085.4; dated Feb. 23, 2023.
Korean Intellectual Property Office (KIPO); Notice of Preliminary Rejection (Non Final) Office Action Patent Application No. 10-2020-7016782; dated Mar. 21, 2023.
European Patent Office (EPO); Communication; EP Application No. 18803991.1; dated Apr. 5, 2023.
Japanese Intellectual Property Office (JPO); Office Action; JP Patent Application No. 2020-526985; dated Jun. 22, 2023.
European Patent Office; International Search Report, International Patent Application No. PCT/EP2018/081653; Dec. 11, 2018.
European Patent Office; Communication Pursuant to Article 94(3) EPC; EP Application No. 18803991.1; dated Jul. 21, 2021.
China National Intellectual Property Administration (CNIPA); 1st Office Action; PRC (China) Patent Application No. 201880074085.4; dated Dec. 15, 2021.
Japanese Intellectual Property Office (JPO); Office Action; JP Patent Application No. 2020-526985; dated Sep. 5, 2022.
China National Intellectual Property Administration (CNIPA); 2nd Office Action; PRC (China) Patent Application No. 201880074085.4; dated Sep. 22, 2022.

* cited by examiner

*Primary Examiner* — Sheeba Ahmed

(74) *Attorney, Agent, or Firm* — Farber LLC

(57) ABSTRACT

A multilayer protective film comprising a polyvinylidene fluoride/acrylate polymer layer and one or more thermoplastic polyurethane layers is provided. The multilayer protective film may possess beneficial and desirable properties useful in protecting surfaces, such as for example, high ultraviolet resistance, optical clarity, durability, and gloss.

14 Claims, 1 Drawing Sheet

POLYVINYLIDENE FLUORIDE-ACRYLATE AND THERMOPLASTIC POLYURETHANE MULTILAYER PROTECTIVE FILM

CROSS-REFERENCE TO RELATED APPLICATIONS

This application is a divisional of U.S. application Ser. No. 16/764,378, filed May 14, 2020, which is a U.S. National Stage application of International Application No. PCT/EP2018/081653 filed Nov. 16, 2018, which claims benefit of U.S. Provisional Application No. 62/587,429, filed Nov. 16, 2017, the entire contents of which are incorporated herein by reference.

TECHNICAL FIELD

The present disclosure relates to multilayer protective films, and more particularly, to thermoplastic polyurethane multilayer protective films for the protection of surfaces exposed to harsh or caustic chemicals such as solvents, or to adverse environmental conditions or elements, such as heat, sun, moisture, wind, debris, dirt, or to inclement weather, such as for example, rain, hail, snow, or sleet. Even more particularly, the disclosure relates to a multilayer protective film comprising a polyvinylidene fluoride/acrylate polymer layer and a polycaprolactone-based thermoplastic polyurethane layer, and methods of making the multilayer film.

BACKGROUND

Protective polymer films, such as urethane films, are used to provide a strong and durable shield for any bare or painted metal, glass or plastic surface that may be exposed to extreme environmental conditions or elements, such as heat, sun, moisture, wind, debris, dirt, or those due to inclement weather, such as for example, rain, hail, snow, or sleet, as well as harsh or corrosive chemicals such as solvents or the like. These protective urethane films are useful for preventing damage from abrasion, chipping, deterioration or discoloration, and wear of the surfaces under those circumstances. Such films may be used to protect, for example, cars, trucks, appliances, mobile devices, computers, electronic display screens, and more.

Polyvinylidene fluoride (PVDF) polymers have high resistance to ultraviolet radiation and extremes of temperature and humidity. It would therefore be desirable to provide an extrudable, multilayer protective film comprising polyvinylidene fluoride having high ultraviolet resistance, optical clarity, durability, and gloss.

BRIEF SUMMARY

The present disclosure generally relates to a thermoplastic multilayer protective film comprising a polyvinylidene fluoride/acrylate polymer layer and one or more thermoplastic polyurethane layers that possess beneficial properties useful in protecting surfaces from harmful environmental conditions or elements, or harsh chemicals.

According to one aspect of the present disclosure, a multilayer film is provided. The multilayer film may comprise a first layer comprising a polyvinylidene fluoride (PVDF)/acrylate polymer blend and a second layer comprising a polycaprolactone-based thermoplastic polyurethane, wherein the first layer is bonded to a major surface of the second layer. In one embodiment, the PVDF/acrylate polymer blend may comprise PVDF and polymethymethacrylate (PMMA). In another embodiment, the PVDF/acrylate polymer blend may comprise a blend of acrylate homopolymers and copolymers.

In some embodiments, the first layer and the second layer may be extrudable. In some embodiments, the thermoplastic polyurethane layer may comprise one or more layers of aliphatic polycaprolactone-based thermoplastic polyurethane. In some embodiments, the PVDF/acrylate polymer layer and the thermoplastic polyurethane layer may be co-extruded.

According to another aspect of the present disclosure, the multilayer film may comprise a third layer comprising a pressure sensitive adhesive, wherein the third layer is bonded to an opposite major surface of the second layer such that the second layer is between the first layer and the third layer.

According to still another aspect of the present disclosure, a multilayer film is provided. The multilayer film may comprise a first layer comprising a polyvinylidene fluoride (PVDF)/acrylate polymer blend, and a second layer comprising a polycaprolactone-based thermoplastic polyurethane. The first layer may be bonded to a major surface of the second layer. The multilayer film may have a gloss of greater than about 80 gloss units, a Sharpie® stain resistance of less than about 7% change in light transmission, a tar stain resistance of less than about 10 change in yellowness index, and a scratch resistance such that 60° gloss is reduced by 20 gloss units or less.

According to yet another aspect of the present disclosure, a method of making a multilayer film is provided. The method may comprise forming a first layer comprising a polyvinylidene fluoride (PVDF)/acrylate polymer blend, forming a second layer comprising a polycaprolactone-based thermoplastic polyurethane, and bonding the first layer to the second layer. In some embodiments, the first layer and the second layer may be coextruded. In other embodiments, the first layer and the second layer may be sequentially extruded.

The recitation herein of desirable objects which are met by various embodiments of the present disclosure is not meant to imply or suggest that any or all of these objects are present as essential features, either individually or collectively, in the most general embodiment of the present disclosure or in any of its more specific embodiments.

DETAILED DESCRIPTION

Except as otherwise noted, any quantitative values are approximate whether the word "about" or "approximately" or the like are stated or not. The materials, methods, and examples described herein are illustrative only and not intended to be limiting. Any molecular weight or molecular mass values are approximate and are provided only for description.

Figure 1:
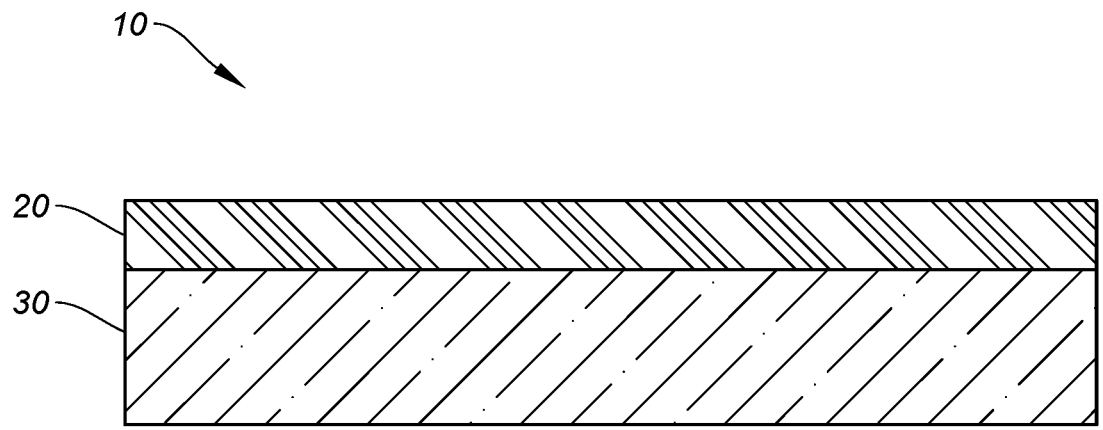
FIG. 1 is a cross-sectional view illustrating an exemplary embodiment of a two layer film of the present disclosure.

The present disclosure provides a multilayer protective film comprising a polyvinylidene fluoride (PVDF)/acrylate polymer blend layer and one or more thermoplastic polyurethane layers. FIG. 1 shows an exemplary embodiment of a multilayer film 10 comprising a PVDF/acrylate layer 20 and a thermoplastic polyurethane layer 30. The multilayer protective film may possess beneficial and desirable properties useful in protecting surfaces, such as for example, high ultraviolet resistance, optical clarity, durability, and gloss.

As used herein, "PVDF" is meant to include homopolymers of PVDF (e.g., Kynar 720, Arkema) as well as vinylidene fluoride copolymers containing minor amounts, such as for example, up to about 30% by weight, of other ethylenically unsaturated monomers including, but not limited to, tetrafluoroethylene, chlorotrifluoroethylene, hexafluoropropylene, and ethylene. Examples of PVDF copolymers include, but are not limited to, Solef 21508 (Solvay S. A.), Kynar Flex 3120-50 (Arkema), Kynar Super Flex 2500 (Arkema), Kynar Flex 2750 (Arkema), Kynar Flex 2850-00 (Arkema), and Kynar Flex 3120-10 (Arkema).

Acrylate polymers can include homopolymers and copolymers of lower alkyl (methyl, ethyl, propyl, butyl) methacrylates including copolymers with minor amounts of other acrylates and/or ethylenically unsaturated monomers, such as for example, styrene, alpha-methyl styrene, and acrylonitrile. Examples of PMMA polymers include, but are not limited to, Plexiglas® VS-100 (Arkema), Plexiglas® V825 (Arkema), and Plexiglas® V920 (Arkema).

In some embodiments, the PVDF/acrylate polymer ratio (by weight) is from about 50/50 to about 95/5. In other embodiments, the PVDF/acrylate polymer ratio (by weight) is from about 60/40 to about 90/10. In still other embodiments, the PVDF/acrylate polymer ratio (by weight) is from about 70/30 to about 80/20. In one embodiment, the PVDF/acrylate polymer ratio (by weight) is about 70/30.

The PVDF/acrylate polymer blend can contain additives including, but not limited, to ultraviolet absorbing compounds (e.g. Tinuvin® 234, BASF) and thermal and ultraviolet stabilizers, such as for example, cyanoacrylate esters, hindered amine light stabilizers (HALS), antioxidants, benzotrizoles, nonpolymeric benzophenones, and anti-scratch additives (for example, GANZPEARL (Aica Kogyo Co.), PMX 200-30 m000 cSt (Xiameter Dow Corning), and PMX 200-100,000 cSt (Xiameter Dow Corning)).

The thermoplastic polyurethane (TPU) can be any acrylic-compatible polymer, such as for example, polycarbonate, polyester, and polycaprolactone. The TPU layer may contain multiple layers of the same or different thermoplastic polyurethane polymers, such as for example, a layer of polyester-based thermoplastic polyurethane polymer bonded to a layer of polycaprolactone-based thermoplastic polyurethane. The thermoplastic polyurethane polymer can contain minor amounts of additives such as plasticizers, antioxidants, fillers, and pigments. In one embodiment, the multilayer film may comprise one or more layers of an aliphatic, polycaprolactone-based thermoplastic polyurethane. Examples of aliphatic, polycaprolactone-based thermoplastic polyurethanes include, but are not limited to, Lubrizol CLC 93AV and ArgoGUARD® 49510 (Argotec, Greenfield, MA).

The thickness of the PVDF/acrylate polymer blend layer can be up to about 3 mil. In one embodiment, the thickness of the PVDF/acrylate polymer blend layer can be from about 0.4 mil to about 3 mil. In another embodiment, the thickness of the PVDF/acrylate polymer blend layer is from about 0.5 mil to about 1.5 mil. The thickness of the thermoplastic polyurethane layer can be up to about 6 mil. In one embodiment, the thickness of the thermoplastic polyurethane layer is from about 3 mil to about 6 mil. In another embodiment, the thickness of the thermoplastic polyurethane layer is from about 4.5 mil to about 5.5 mil. In one embodiment, the thickness of the PVDF/acrylate polymer blend layer is about 0.5 mil and the thickness of the thermoplastic polyurethane layer is about 5.5 mil. In another embodiment, the thickness of the PVDF/acrylate polymer blend layer is about 1 mil and the thickness of the thermoplastic polyurethane layer is about 5 mil.

Figure 2:
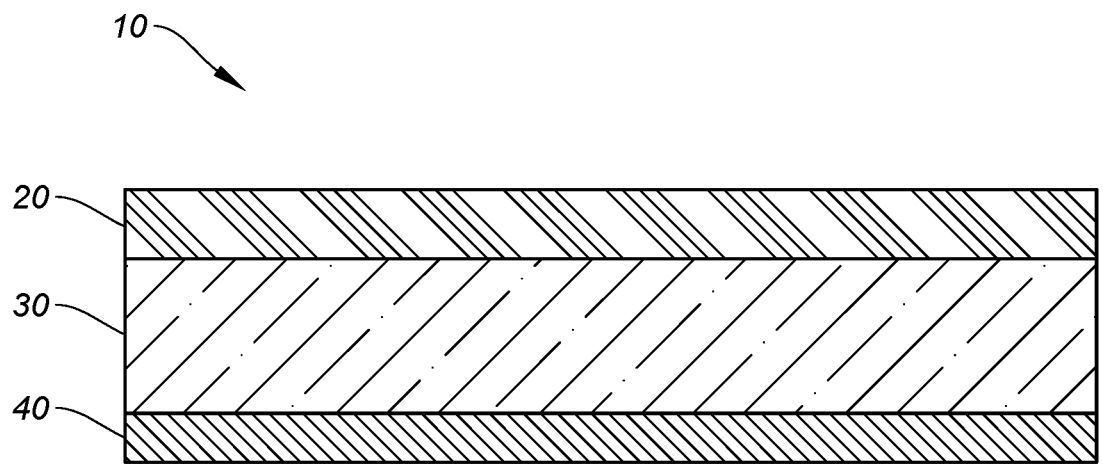
FIG. 2 is a cross-sectional view illustrating an exemplary embodiment of a three layer film of the present disclosure.

Referring to FIG. 2, the multilayer film 10 may include an adhesive 40 bonded to the surface of the thermoplastic polyurethane layer 30 that is opposite to the surface bonded to the PVDF/acrylate polymer blend layer 20. For example, the thermoplastic polyurethane base layer may be corona treated and laminated to an adhesive, including, but not limited to, polyacrylate-based adhesives, silicone-based adhesives, synthetic and natural rubbers, polybutadiene and copolymers and polyisoprenes and copolymers. In one embodiment, the adhesive is a pressure sensitive adhesive (PSA).

Optionally, the PVDF/acrylate polymer blend layer of the multilayer film may be coated with a top coat.

According to an aspect of the disclosure, the multilayer film may be clear or transparent, and may be suitable for certain applications such as for paint protection. However, it is understood that in some embodiments, the multilayer film may be colored as desired. For example, one or more layers of the multilayer film may comprise pigment or other coloring agent. The multilayer film may be shaped and sized to conform to a surface to be protected before application to the surface. For example, the multilayer film may be used to protect various parts of a vehicle from ultraviolet light, weather, scratches from debris such as dirt, rocks, etc.

In accordance with another aspect of the present disclosure, methods of making the multilayer film are provided. The methods may comprise: (a) forming a PVDF/acrylate layer, (b) forming a thermoplastic polyurethane layer comprising one or more layers of a thermoplastic polyurethane, and (c) bonding the PVDF/acrylate layer to the thermoplastic polyurethane layer.

The layers of the multilayer sheet can be formed using conventional methods known in the art such as extrusion, calendaring, and solvent casting. For example, the multilayer sheet can be formed by co-extrusion of the PVDF/acrylate polymer blend layer and the thermoplastic polyurethane layer using a multimanifold coextrusion die or a coextrusion feedblock approach. In a two extruder feedblock process, the PVDF/acrylate blend can be melted in an extruder barrel and pumped through a first adaptor section and adaptor tube, which may be heated by a heater, into the coextrusion feedblock where it contacts the melt stream of the thermoplastic polyurethane polymer which is being fed from a second extruder through a second adaptor section. Due to laminar flow, no intermixing of the two melt streams occurs, resulting in two discrete layers of material in intimate contact. The stratified, combined melt stream then enters the processing die where the form of the final composite product which exits from the die lips is established.

Conventional methods such as a three extruder feedblock process may be used to make a multilayer sheet comprising a PVDF/acrylate polymer blend top layer and a layer comprising two layers of a thermoplastic polyurethane.

EXAMPLES

Examples 1-3

A UV stabilized pelletized PVDF fluorinated thermoplastic homopolymer (Kynar 720, Arkema) was dry blended with a very high melt flow pelletized PMMA thermoplastic (Plexiglas® VS-100, Arkema) at multiple ratios detailed in Table 1. The resins were dried for a minimum of 4 hours at 55° C. then cast as film onto a high gloss PET film using a 1.75 inch single screw extruder fitted with a sheet die. The film was quench cooled using a 3 roll chill roll stack. Approximately 24 hours later, the blended PVDF/PMMA film was stripped from the PET carrier and measured for optical properties. Unless otherwise specified, gloss is measured at an angle of 60 degrees (°) and calibrated using a black glass standard of 100 gloss units (GU) ("GU, 60°" or "60° Gloss"). Values are represented in Table 1.

TABLE 1

|  |  | Example 1 | Example 2 | Example 3 |
|---|---|---|---|---|
| Kynar 720 | PVDF Homopolymer | 70 | 65 | 60 |
| Plexiglas VS-100 | PMMA | 30 | 35 | 40 |
| Optical Properties |  |  |  |  |
| Gloss | GU, 60° | 85.2 | 87 | 87.5 |
| Yellowness Index (YI) | ASTM D-1925 | 0.33 | 0.31 | 0.35 |
| Light Transmission (T) | % T | 95.2 | 95.2 | 95.1 |
| Haze | % | 1.22 | 0.90 | 0.93 |

Films with good optical performance were achieved, i.e., high light transmission, low Yellowness Index (YI), good gloss and haze values in the nominal 1 range.

Other key physical properties include scratch and stain resistance as reported in Table 2.

TABLE 2

| Stain and Scratch Resistance |  | Example 1 | Example 2 | Example 3 |
|---|---|---|---|---|
| Sharpie ® Stain | Δ % T | 1.9 | 1.7 | 1.7 |
| Tar Stain | Δ YI | 2.25 | 2.96 | 2.41 |
| Scratch Resistance | Δ Gloss (GU, 60°) | −15.6 | −15.7 | −20.4 |
| Scratch Recovery | Δ Gloss (GU, 60°) Post 24 hrs. | Nil | Nil | Nil |

Sharpie® stain resistance was measured by applying a coating of black Sharpie® marker to the film, allowing the marker to set for 2 minutes, followed by a vigorous 70% isopropyl alcohol (IPA) wiping using an IPA soaked cotton cloth until no more ink was removable. The Sharpie® stain resistance was reported as the difference in % light transmission of the original film versus the stained then IPA wiped film.

Tar stain resistance was measured by applying a blotch of tar to the film, baking the tar/film specimen for 60 minutes at 80° C. Then the tar was removed using GM Bug and Tar Remover with a cotton rag. The tar resistance was measured by reporting the difference in the film's YI before and after exposure.

Scratch resistance was measured by 60° gloss of the film before and after abrading using 200 grit sand paper for a fixed number of abrading wipes under a constant load. Scratch Recovery was reported as the difference between the original gloss value and the gloss value of the film 24 hours post abrasion.

Resistance to accelerated UV aging was conducted by QUV and Xenon arc, with similar results. The Xenon Arc aging was performed in accordance with Volkswagen AG PV3927 Non Metallic Materials Weather Aging in Dry, Hot Climate, aka Kalahari Test. The results of the Kalahari Test are represented in Table 3.

TABLE 3

| UV Stability - Kalahari Aging | Example 1 | Example 3 |
|---|---|---|
| ΔYI - 500 hrs | 0.16 | 0.14 |
| ΔYI - 1000 hrs | 0.13 | −0.01 |
| ΔYI - 1500 hrs | 0.15 | 0.09 |
| ΔYI - 2000 hrs | 0.34 | 0.32 |
| Δ% T - 500 hrs | −0.1 | −0.1 |
| Δ% T - 1000 hrs | −0.1 | −0.3 |
| Δ% T - 1500 hrs | −0.2 | −0.2 |
| Δ% T - 2000 hrs | 0.0 | 0.0 |
| Δ% Haze - 500 hrs | 0.18 | −0.26 |
| Δ% Haze - 1000 hrs | 0.11 | −1.06 |
| Δ% Haze - 1500 hrs | 0.62 | 0.47 |
| Δ% Haze - 2000 hrs | 1.70 | −0.38 |
| ΔGloss (GU, 60°) - 500 hrs | −4.1 | 1.00 |
| ΔGloss (GU, 60°) - 1000 hrs | −9.3 | −2.9 |
| ΔGloss (GU, 60°) - 1500 hrs | −4.2 | −9.3 |
| ΔGloss (GU, 60°) - 2000 hrs | −6.0 | −5.9 |
| Embrittled during Aging | No | Yes |

Examples 4-6

A UV stabilized pelletized PVDF fluorinated thermoplastic copolymer (Solef 21508; Solvay S. A.) was dry blended with a very high melt flow pelletized PMMA copolymer thermoplastic at (Plexiglas® VS-100) multiple ratios as detailed in Table 1. The resins were dried for a minimum of 4 hours at 55° C. then cast as film onto a high gloss PET film using a 1.75 inch single screw extruder fitted with a sheet die. The film was quench cooled using a 3 roll chill roll stack. Approximately 24 hours later, the blended PVDF/PMMA film was stripped from the PET carrier and measured for optical properties. Those values are represented in Table 4.

TABLE 4

|  |  | Example 4 | Example 5 | Example 6 |
|---|---|---|---|---|
| Solef 21508 | PVDF Copolymer | 70 | 65 | 60 |
| Plexiglas VS-100 | PMMA Copolymer | 30 | 35 | 40 |
| Optical Properties |  |  |  |  |
| Gloss | GU, 60° | 82.3 | 79.1 | 83.1 |
| Yellowness Index (YI) | ASTM D-1925 | 0.55 | 0.34 | 0.26 |
| Light Transmission | % T | 95.6 | 95.2 | 95.2 |
| Haze | % | 2.03 | 0.67 | 0.73 |

Copolymer based films possessed similar optical properties as the PVDF homopolymer/PMMA blends.

Other key physical properties include scratch and stain resistance as represented in Table 5.

TABLE 5

| Stain and Scratch Resistance |  | Example 4 | Example 5 | Example 6 |
|---|---|---|---|---|
| Sharpie ® Stain | Δ % T | 7.3 | 5.9 | 11.1 |
| Tar Stain | Δ YI | 5.13 | 5.61 | 4.62 |
| Scratch Resistance | Δ Gloss (GU, 60°) | −15.8 | −13.8 | −16.2 |
| Scratch Recovery | Δ Gloss (GU, 60°) Post 24 hrs | Nil | Nil | Nil |

Both Sharpie® and tar stain resistance properties were poorer versus those blends containing homopolymer PVDF, Examples 1-3. Scratch resistance and recovery properties were similar for both the homopolymer and copolymers of PVDF blends.

Examples 7-9

Three sample composite films were accomplished on the Line F coextrusion line. The trial's objective was to produce a 0.0005 inch PVDF-PMMA/0.0055 inch CLC 93AV TPU (aliphatic polycaprolactone thermoplastic polymer) coextruded film using standard production equipment and processes to coextrude a two layer surface protection film with hardcoat that affords excellent stain resistance, optical clarity, low color, and high gloss and coextrusion film layer uniformity. The film required appropriate mechanical properties to allow for ease of installation, those being low secant modulus, high elongation and snap back or film stretch recovery. Additionally the composite film required good interlayer bond strength to resist delamination caused by both installation and from environmental stresses that can be experienced by automobiles in all environments where automobiles are used.

Hardcoat Trial Formulations: Each of the composite films' hardcoat formulations are outlined in Table 6. Each formulation was designed around a previously determined optimum blend ratio of 70% PVDF and 30% PMMA. Prior to coextrusion, formulations Example 7 and Example 8 were melt compounded and pelletized via twin screw extrusion, whereas formulation Example 9, a duplication of Example 8, was only dry blended as pellets.

TABLE 6

| Formulation | Example 7 | Example 8 | Example 9 |
| --- | --- | --- | --- |
| Kynar 720 (hPVDF) | | 18 | 18 |
| Solef 21508 (coPVDF) | 70 | 52 | 52 |
| Plexiglas VS-100 (PMMA) | 30 | 30 | 30 |

Film Conversion: Film processing was accomplished in two stages as outlined:

Stage 1: The coextrusion of a 0.002 inch dual layer film was comprised of a 0.0005 inch PVDF-PMMA hardcoat in conjunction with a 0.0015 inch CLC 93AV layer. The hardcoat was cast in the orientation as the bottom layer then combined with a PET film carrier as the molten film was cooled on a chill roll stack.

Stage 2: The extrusion coating (second pass) of an additional 0.004 inches of CLC 93AV on top of the 0.0015 inch thick CLC 93AV layer of the composite film produced in Stage 1 to yield total composite film thickness of 6 mil.

The composite film layer thicknesses were confirmed by cross-sectional microscopic measurements.

Key Physical Properties were measured as represented in Tables 7-9.

TABLE 7

| Optical Properties | | Example 7 | Example 8 | Example 9 |
| --- | --- | --- | --- | --- |
| Gloss | GU, 60° | 82.2 | 82.8 | 83.1 |
| Yellowness Index (YI) | ASTM D-1925 | 0.75 | 0.6 | 0.64 |
| Light Transmission (T) | % T | 94.6 | 94.5 | 94.6 |
| Haze | % | 1.44 | 1.7 | 2.03 |

TABLE 8

| Stain and Scratch Resistance | | Example 7 | Example 8 | Example 9 |
| --- | --- | --- | --- | --- |
| Sharpie ® Stain | Δ% T | 6.2 | 6.7 | 6.5 |
| Tar Stain | ΔYI | 1.18 | 1.04 | 0.71 |
| Scratch Resistance (GU, 60°) | ΔGloss | −15.8 | −15.2 | −15.0 |
| 24 Hr. Scratch Recovery (GU, 60°) | ΔGloss | 30% | 20% | 22% |

TABLE 9

| Physical Properties | | Example 7 | Example 8 | Example 9 |
| --- | --- | --- | --- | --- |
| Tensile Strength MD | PSI | 7,780 | 9,555 | 8,650 |
| Tensile Strength TD | PSI | 10,055 | 8,795 | 10,515 |
| Percent Elongation MD | % | 455 | 575 | 470 |
| Percent Elongation TD | % | 545 | 500 | 540 |
| 2% Secant Modulus MD | PSI | 3,815 | 5,245 | 4,420 |
| 2% Secant Modulus TD | PSI | 3,290 | 4,190 | 4,529 |
| Ply Adhesion - Peel Force | g/inch | 28.6 | 28.7 | 27.8 |
| Dimensional Stability MD | % Δ | −3.50 | −2.56 | −9.40 |
| Dimensional Stability TD | % Δ | −0.10 | 0.71 | −2.25 |

Based on the physical property difference measured between the twin screw extrusion compounded Example 8 and dry blended Example 9, there were negligible differences in film quality.

While the invention has been described in detail herein in accordance with certain preferred embodiments thereof, many modifications and changes therein may be effected by those skilled in the art. Accordingly, the foregoing disclosure should not be construed to be limited thereby but should be construed to include such aforementioned obvious variations and be limited only by the spirit and scope of the following claims.

What is claimed is:

1. A method of making a multilayer film characterized in that the method comprises:
    (a) forming a first layer comprising a polyvinylidene fluoride (PVDF)/acrylate polymer blend;
    (b) forming a second layer consisting of a polycaprolactone-based thermoplastic polyurethane; and
    (c) bonding the first layer to a major surface of the second layer.

2. The method as claimed in claim 1, characterized in that the first layer and the second layer are coextruded.

3. The method as claimed in claim 1, characterized in that the first layer and the second layer are sequentially extruded.

4. The method of claim 1, characterized in that the multilayer film is transparent.

5. The method of claim 1, further comprising adding a color pigment or a coloring agent to at least one of the layers.

6. The method of claim 1, further comprising bonding an adhesive to the second layer.

7. The method of claim 5, further comprising corona treating the second layer.

8. The method of claim 1, further comprising coating the first layer with a top coat.

9. The method of claim 1, further comprising:
    (a) forming a third layer comprising a thermoplastic polyurethane; and
    (b) bonding the third layer to the second layer to form a layer comprising two layers of thermoplastic polyurethane.

10. The method of claim 9, characterized in that the first layer is bonded to the layer comprising two layers of thermoplastic polyurethane.

11. The method of claim 9, further comprising bonding an adhesive to the third layer.

12. The method of claim 9, further comprising corona treating the third layer.

13. The method of claim 9, wherein the second and third layers comprise the same thermoplastic polyurethane.

14. The method of claim 9, wherein the second and third layers comprise different thermoplastic polyurethanes.

* * * * *